(12) United States Patent
Cozzetti

(10) Patent No.: US 10,932,127 B2
(45) Date of Patent: Feb. 23, 2021

(54) EVALUATING TRUSTWORTHINESS OF DATA TRANSMITTED VIA UNENCRYPTED WIRELESS MOBILE COMMUNICATIONS

(71) Applicant: Fortinet, Inc., Sunnyvale, CA (US)

(72) Inventor: H. Agustin Cozzetti, Vallauris (FR)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/263,164

(22) Filed: Jan. 31, 2019

(65) Prior Publication Data
US 2019/0261171 A1    Aug. 22, 2019

Related U.S. Application Data

(60) Provisional application No. 62/632,189, filed on Feb. 19, 2018.

(51) Int. Cl.
| | |
|---|---|
| *H04M 1/66* | (2006.01) |
| *H04W 12/00* | (2021.01) |
| *H04W 12/12* | (2021.01) |
| *H04W 12/10* | (2021.01) |
| *H04W 4/46* | (2018.01) |
| *H04W 4/80* | (2018.01) |

(52) U.S. Cl.
CPC ....... *H04W 12/00506* (2019.01); *H04W 4/46* (2018.02); *H04W 4/80* (2018.02); *H04W 12/1008* (2019.01); *H04W 12/12* (2013.01)

(58) Field of Classification Search
USPC ........ 455/404.2, 410, 411, 421, 412.1, 412.2
See application file for complete search history.

(56) References Cited

U.S. PATENT DOCUMENTS

| | | | |
|---|---|---|---|
| 2016/0381539 A1* | 12/2016 | Park | H04W 4/90 455/404.2 |
| 2017/0131114 A1* | 5/2017 | Li | G08G 1/091 |
| 2017/0132923 A1* | 5/2017 | Li | G08G 1/0112 |

(Continued)

OTHER PUBLICATIONS

Intelligent Transport Systems (ITS); Vehicular Communications; Basic Set of Applications; Part 2: Specification of Cooperative Awareness Basic Service. ETSI EN 302 637-2 V1.3.1 (Sep. 2014). 44pgs.

(Continued)

*Primary Examiner* — David Q Nguyen

(57) ABSTRACT

Systems and methods for making local decisions regarding the trustworthiness of V2V communications are provided. According to one embodiment, a vehicle information packet is received by a vehicle connectivity subsystem of a connected car and is indicative of an attribute of a source from which the packet was received. The source purportedly represents a neighboring vehicle in proximity to the connected car. A trustworthiness value for the packet is determined based on the source and coherence of the packet with local information maintained by the connected car. The trustworthiness value is indicative of a likelihood that the source represents a neighboring vehicle in proximity to the connected car from which communications are to be trusted. An action to be taken by the vehicle connectivity subsystem is determined with respect to the source or the packet based on the trustworthiness value. The determined action taken by the vehicle connectivity subsystem.

40 Claims, 13 Drawing Sheets

(56) References Cited

U.S. PATENT DOCUMENTS

2018/0053405 A1* 2/2018 de Azevedo ......... G08G 1/0133
2018/0151071 A1* 5/2018 Park ..................... G01S 13/865
2019/0012908 A1* 1/2019 Chun ..................... G01S 19/42
2019/0327012 A1* 10/2019 Park ........................ H04J 11/00

OTHER PUBLICATIONS

Intelligent Transport Systems (ITS); Vehicular Communications; Basic Set of Applications;Part 3: Specifications of Decentralized Environmental Notification Basic Service. ETSI EN 302 637-3 V1.2.1 (Sep. 2014). 73 pgs.

Intelligent Transport Systems (ITS); Vehicular Communications; Basic Set of Applications; Part 1: Functional Requirements. ETSI TS 102 637-1 V1.1.1 (Sep. 2010). 60 pgs.

* cited by examiner

EVALUATING TRUSTWORTHINESS OF DATA TRANSMITTED VIA UNENCRYPTED WIRELESS MOBILE COMMUNICATIONS

CROSS-REFERENCE TO RELATED PATENTS

This application claims the benefit of priority to U.S. Provisional Application No. 62/632,189, filed on Feb. 19, 2018, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2018-2019, Fortinet, Inc.

BACKGROUND

Field

Embodiments of the present invention generally relate to the field of wireless mobile communications and vehicular communication systems. In particular, various embodiments relate to cyber-security and evaluating unencrypted wireless mobile communications, such as vehicle-to-vehicle (V2V) or vehicle-to-infrastructure (V2X) wireless mobile communications, to determine the trustworthiness of data packets received.

Description of the Related Art

Connected cars, having one or more driving automation systems, including those supporting any of the six levels of driver assistance technology specified by the Society of Automotive Engineers (SAE) International, are currently referred to by numerous terms (e.g., self-driving cars, computer-controlled cars, autonomous vehicles, driverless cars and the like). Connected cars rely on wireless mobile communications (e.g., defined by standards, like IEEE 802.11p and IEEE 1609) to exchange data in order to make decisions concerning dangerous situations for the drivers or for path optimization. The data packets exchanged include those in a form of a Cooperative Awareness Message (CAM) (specified by European Telecommunications Standards Institute (ETSI)-EN 302 637-2 v1.3.1 (2014-09), entitled "Intelligent Transport Systems (ITS); Vehicular Communications; Basic Set of Applications; Part 2: Specification of Cooperative Awareness Basic Service," which is hereby incorporated by reference in its entirety for all purposes), a Decentralized Environmental Notification Message (DENM) (specified by ETSI-EN 302 637-3 v1.2.1 (2014-09), entitled "Intelligent Transport Systems (ITS); Vehicular Communications; Basic Set of Applications; Part 3: Specification of Decentralized Environmental Notification Basic Service," which is hereby incorporated by reference in its entirety for all purposes) and those sent via the Wireless Access in a Vehicle Environment (WAVE) Short Message (WSM) protocol. The IEEE standards specify data exchange methodologies between high-speed vehicles (V2V communications) and between the vehicles and the roadside infrastructure (V2X communications), in the licensed Intelligent Transportation Systems (ITS) band of 5.9 GHz (5.85-5.925 GHz). V2V and V2X communications have been designed to be very efficient so as to mitigate propagation problems and constrains in wireless mobile communications (e.g., shadow phenomena, obstruction, real-time constraints on delay and the like). Typical terms used to refer to communications among connected cars include Vehicular Ad-hoc Networks (VANETs), Car-to-Car communication (Car2Car, C2C), or Vehicle-to-Vehicle (V2V) communication. As used herein, the term V2V communications is intended to encompass such communications among connected cars and V2V data packets are intended to refer to individual messages (e.g., CAMs and DENMs) or other data packets exchanged among connected cars.

V2V communications enable wireless transmission of data packets between vehicles pertaining to factors such as location, speed, direction, braking status, and the like to provide each other with information regarding, among other things, safety warnings, traffic conditions, potential accidents, obstacles and crashes. Based on V2V communications from neighboring vehicles, the recipient vehicle can take preemptive actions such as braking, decelerating, and/or altering its path.

Due to the volume of V2V and V2X data packets continuously being exchanged and associated constraints on overhead and timing for processing such data packets, they are sent unencrypted and cyber-security measures typically employed in an enterprise Information Technology (IT) infrastructure, e.g., security protocols, authentication and firewalling, are not employed. As a result, it is possible for malicious actors to exploit these unprotected V2V and V2X communications by, for example, injecting bogus packets into the data streams.

There is therefore a need for an improved security approach that meets the strict overhead and timing constraints associated with V2V and V2X communications.

SUMMARY

Systems and methods are described for making local decisions regarding the trustworthiness of V2V communications based on a combination of data correlation and data fusion. According to one embodiment, a security algorithm is applied to vehicle information packets/messages received by a vehicle connectivity subsystem of a connected car. A vehicle information packet is received by the vehicle connectivity subsystem. The vehicle information packet is indicative of one or more attributes of a source of multiple sources from which the vehicle information packet was received. The sources purportedly represent neighboring vehicles in proximity to the connected car. A trustworthiness value for the vehicle information packet is determined based on the source and coherence of the vehicle information packet with local information maintained by the connected car. The trustworthiness value is indicative of a likelihood that the source represents a neighboring vehicle in proximity to the connected car from which communications are to be trusted. An action to be taken by the vehicle connectivity subsystem is determined with respect to the source or the vehicle information packet based on the trustworthiness value. The determined action taken by the vehicle connectivity subsystem.

According to another embodiment, a security algorithm is applied to event information packets/messages received by a vehicle connectivity subsystem of a connected car. An event information packet is received by the vehicle connectivity subsystem from a source of multiple sources purportedly representing neighboring vehicles in proximity to the connected car. The event information packet is indicative of an event that has potential impact on road safety or traffic conditions. A trustworthiness value for the event information packet is determined based on the source and coherence of the event information packet with local information maintained by the connected car. The trustworthiness value is indicative of a likelihood that the source represents a neighboring vehicle in proximity to the connected car from which communications are to be trusted. An action to be taken is determined by the vehicle connectivity subsystem with respect to the source or the event information packet based on the trustworthiness value. The determined action taken by the vehicle connectivity subsystem.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
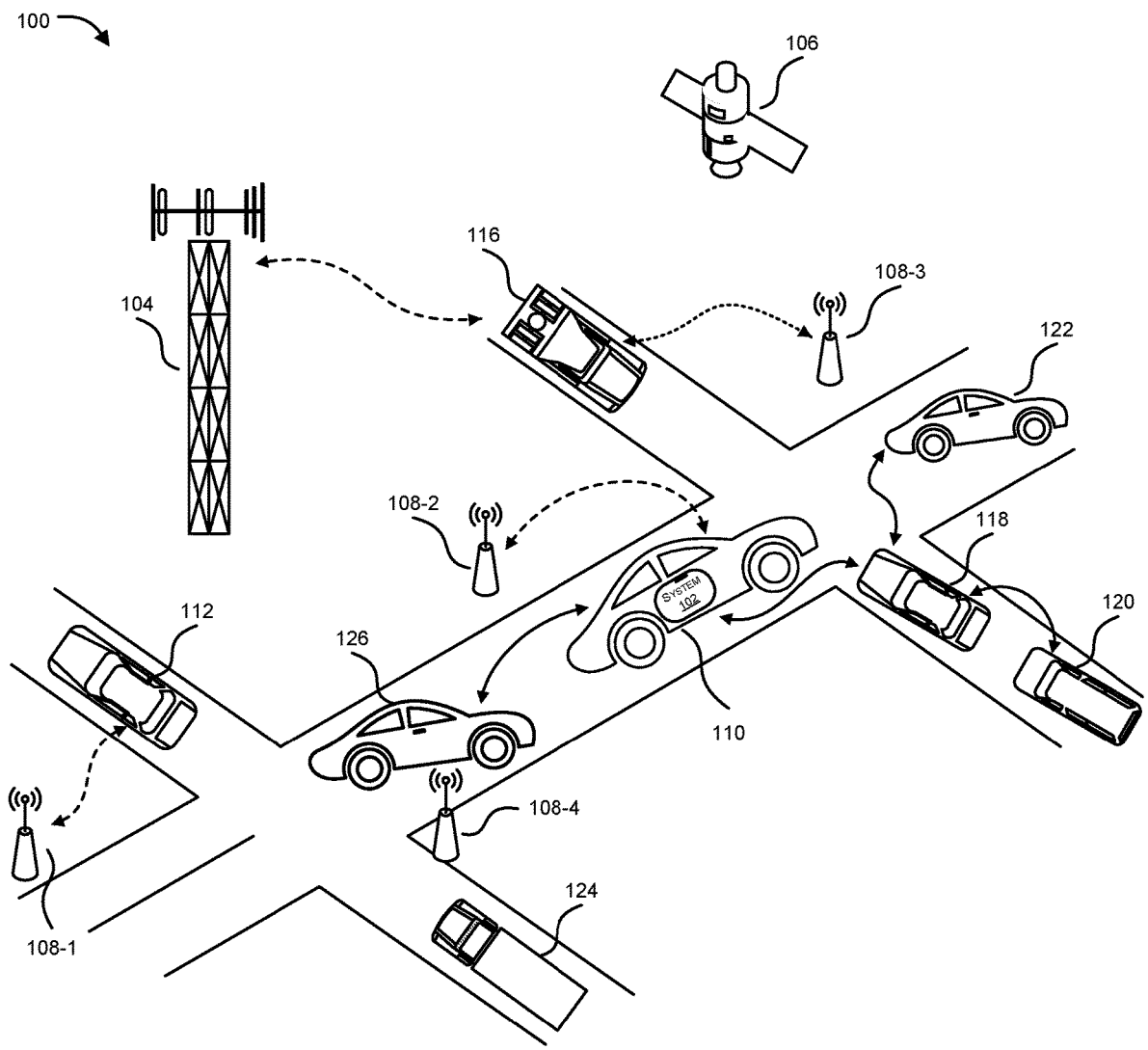
FIG. 1 illustrates an exemplary network architecture in which V2V data packets are exchanged and processed in accordance with an embodiment of the present invention.

Systems and methods are described for making local decisions regarding the trustworthiness of V2V communications based on a combination of data correlation and data fusion. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrases "vehicle information packet" or "vehicle information message" generally refer to a packet/message used by vehicles to facilitate cooperative awareness within road traffic by informing each other about their positions, dynamics and/or attributes. A non-limiting example of a vehicle information packet/message is a cooperative awareness message (CAM).

The phrases "event information packet" or "event information message" generally refer to a packet/message used by vehicles to alert road users of a detected event that has potential impact on road safety or traffic conditions. A non-limiting example of an event information packet/message is a Decentralized Environmental Notification Message (DENM).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

Systems and methods are described for making local decisions regarding the trustworthiness of V2V communications based on a combination of data correlation and data fusion. According to various embodiments of the present invention, the techniques described herein allow a vehicle to make a decision regarding an action to be taken by considering various V2V data packets received from neighboring vehicles. By utilizing techniques of data correlation and data fusion, each received V2V data packet can be associated with a reliability value or trustworthiness based on which, the V2V data packets can be accepted or discarded before making the decision. Further, embodiments of the present disclosure also allow fusion of information contained in data packets obtained from external sources.

An aspect of the present disclosure pertains to a system implemented in a vehicle being configured to make a decision based on the reliability of received V2V data packets from neighboring vehicles. The system includes a non-transitory storage device having embodied therein one or more routines operable to make the decision based on the reliability of received V2V data packets and one or more processors coupled to the non-transitory storage device and operable to execute the one or more routines, wherein the one or more routines include: (i) a data receive module, which when executed by the one or more processors, receives one or more data packets from multiple presumed neighboring vehicles in proximity to a vehicle with which the system is associated, the one or more received data packets including any or a combination of vehicle information packets indicative of attributes of the respective presumed neighboring vehicles, and at least one event information packet indicative of parameters pertaining to at least one event reported by a first neighboring vehicle of the multiple presumed neighboring vehicles; (ii) a data correlation module, which when executed by the one or more processors, correlates the one or more data packets received from the multiple presumed neighboring vehicles so as to associate a reliability value with each of a set of data packets selected from the one or more data packets, the reliability value of a first data packet received from the first presumed neighboring vehicle being determined based on coherence between information received in the first data packet and information received from data packets of other presumed neighboring vehicles, trustworthiness of the first neighboring vehicle, and reliability of vehicle information packets received from the first presumed neighboring vehicle; and (iii) a decision module, which when executed by the one or more processors, makes the decision on an action to be taken based on the reliability value associated with each of the set of data packets selected from the one or more data packets.

FIG. 1 illustrates an exemplary network architecture 100 in which V2V and V2X data packets are exchanged and processed in accordance with an embodiment of the present invention. In the context of the present example, a system 102, which may represent part of or otherwise be associated with a connected car's vehicle connectivity subsystem, can be implemented in a vehicular communication network architecture as illustrated in FIG. 1. A vehicular communication network utilizes wireless mobile communications to enable vehicle to vehicle (V2V) communications and vehicle to roadside infrastructure (V2X) communications. Each connected car (which may hereafter simply be referred to as a "vehicle") can operate as a wireless node that can connect and become a part of the network when within the range of approximately 80 meters to 300 meters. Vehicles within this range of a vehicle at issue are herein deemed to be within proximity to the vehicle at issue and are also considered to be "neighboring" vehicles.

Exemplary architecture 100 as illustrated in FIG. 1 includes a vehicle 110 implementing system 102, various other vehicles 112, 116, 118, 120, 122, 124, and 126, road side units (RSUs) 108-1, 108-2, 108-3 and 108-4, which operate using Worldwide Interoperability for Microwave Access (WiMAX), base station 104 and Global Positioning System (GPS) 106. Vehicle 110 can form a network with neighboring vehicle 126 and 118 such that data packets from neighboring vehicle 126 and 118 can be received by system 102. System 102 may also receive data packets from other external sources, such as road side unit (RSU) 108-2.

The data packets received by system 102 from neighboring vehicles 126 and 118 can include vehicle information packets/messages (e.g., CAMs) and event information packets/messages (e.g., DENMs). The vehicle information packets can be heartbeat packets sent periodically by neighboring vehicles 126 and 118 that can indicate attributes of respective neighboring vehicles 126 and 118 such as acceleration, path history, dimensions, speed, direction, and the like. The event information packet can indicate parameters pertaining to an event that can be reported by any or a combination of neighboring vehicles 126 and 118. Examples of the event information packet can include, but are not limited to, parameters pertaining to location of the event, type of the event, proximity area affected by the event, and the like. Additionally, system 102 can also receive data packets from external sources such as RSU 108-2. Other Examples of external sources include, but are not limited to, a radio detection and ranging (RADAR) system, a light detection and ranging (LIDAR), a sensor, a camera, and the like.

In an aspect, system 102 can correlate data packets that are received from neighboring vehicles 126 and 118 to associate a reliability value or trustworthiness with a set of data packets. Also, information obtained from external sources (e.g., RSU 108-2) can be fused with vehicle information packets and event information packets. Further, based on the reliability value associated with each set of data packets, system 102 can make a decision on an action to be taken. For example, if an accident is reported in close proximity to vehicle 110 implementing system 102 by neighboring vehicle 126 or 118, system 102 can make a decision to decrease the speed of vehicle 110 or to alter its path by considering the trustworthiness of the data packet indicating the accident.

Those skilled in the art will appreciate that embodiments of the present invention are based on techniques pertaining to data correlation and data fusion that enable vehicles to take appropriate preemptive decisions in different situations. The techniques employed by embodiments of the present invention do not include use of any security protocols or data encryption methodologies, thus, introduction of any overhead in vehicular communication system is avoided, thereby providing a faster approach for decision making by the vehicles.

Figure 2:
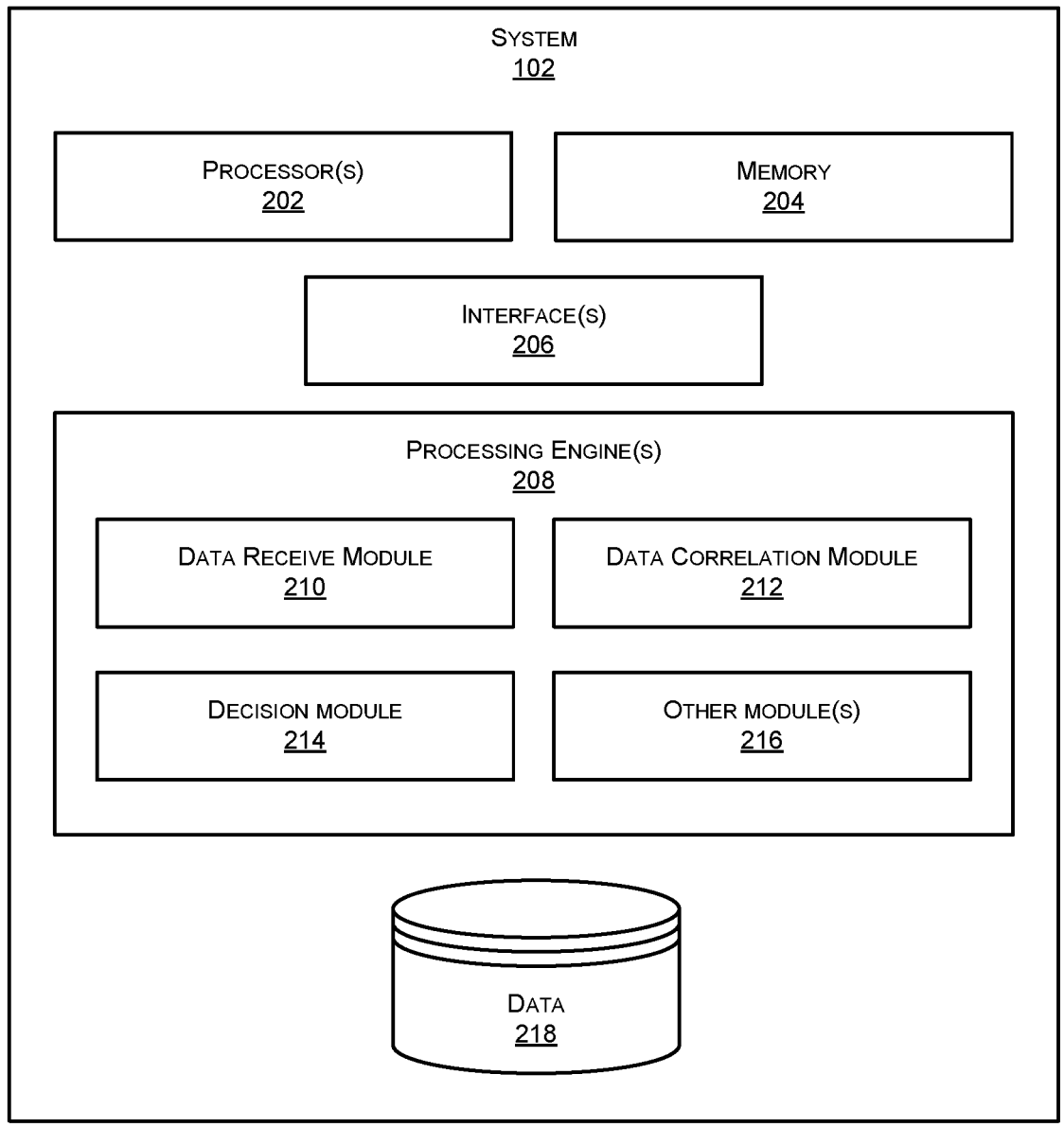
FIG. 2 is a module diagram illustrating functional units of a security system of a connected car in accordance with an embodiment of the present invention.

FIG. 2 is a module diagram illustrating functional units of a security system 102 of a connected car in accordance with an embodiment of the present invention. As illustrated, system 102, which may be implemented in a vehicle, can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of system 102. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

System 102 can also include one or more interface(s) 206. Interface(s) 206 may include a variety of interfaces, for example, interfaces for data input and output devices, referred to as I/O devices, storage devices, and the like. Interface(s) 206 may facilitate communication of system 102 with various devices coupled to system 102. Interface(s) 206 may also provide a communication pathway for one or more components of system 102. Examples of such components include, but are not limited to, processing engine(s) 208 and data 218.

Engine(s) 208 can be implemented as a combination of hardware and software or firmware programming (for example, programmable instructions) to implement one or more functionalities of engine(s) 208. In examples described herein, such combinations of hardware and software or firmware programming may be implemented in several different ways. For example, the programming for engine(s) 208 may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, system 102 can include the machine-readable storage medium storing the instructions and the processing resource to execute the instructions, or the machine-readable storage medium may be separate but accessible to system 102 and the processing resource. In other examples, engine(s) 208 may be implemented by electronic circuitry. System 102 can include data 218 that is either stored or generated as a result of functionalities implemented by any of the components of engine(s) 208.

In an example, processing engine(s) 208 can include a data receive module 210, a data correlation module 212, a decision module 214, and other module(s) 216. Other module(s) 216 can implement functionalities that supplement applications or functions performed by system 102 or processing engine(s) 208.

In an aspect, data receive module 210 can receive data packets from neighboring or presumed neighboring vehicles (referred to as neighboring vehicles hereinafter) that includes vehicles as well as other computing devices, which are within a proximity and can communicate with vehicle implementing system 102. The computing devices can include electronic devices implementing specialized computers to send data packets to the vehicle implementing system 102. Those skilled in the art will appreciate that the computing devices or neighboring vehicles can inject false or bogus data packets in V2V and V2X communications, responsive to which vehicles may take incorrect preemptive actions. Thus, system 102 attempts to determine the trustworthiness/reliability of received event information packets/messages and vehicle information packets/messages to improve vehicle performance and road traffic safety.

The data packets received by system 102 can include any or a combination of vehicle information packets and event information packets. The vehicle information packets can be heartbeat packets, for example, Cooperative Awareness Message (CAM) sent by each vehicle periodically (say, every 0.1 second). Data receive module 210 can capture these vehicle information packets that are sent from neighboring vehicles. The vehicle information packets can indicate attributes of respective neighboring vehicle that include, but are not limited to, Global Positioning System (GPS) coordinates, acceleration, path history, dimensions, speed, direction, and the like. An event information packet can be, for example, a Decentralized Environmental Notification Message (DENM), that can indicate parameters pertaining to at least one event that is reported by a neighboring vehicle. Examples of the event information contained within an event information packet/message include, but are not limited to, parameters pertaining to location of the event, the type of event, proximity area affected by the event, and the like. In an embodiment, an event can be any scenario reported by any neighboring vehicle for example, an accident location, a blockage on a road, breaking down of the neighboring vehicle, deceleration of a neighboring vehicle, acceleration of a neighboring vehicle, change in direction of a neighboring vehicle, etc.

In an aspect, data correlation module 212 can correlate data packets that are received from neighboring vehicles to determine various factors such as coherence between information received in a data packet and information received from data packets of other presumed neighboring vehicles, trustworthiness of a neighboring vehicle, and reliability of vehicle information packets received from the first presumed neighboring vehicle. In an example, in order to determine the above-mentioned factors, data correlation module 212 can ascertain whether data receive module 210 has received data packets from a new vehicle that has recently come within proximity to the vehicle implementing system 102 or has received data packets from an existing neighboring vehicle from which it has received data packets before. From the data packets, data correlation module 212 can determine attributes of the neighboring vehicle. In another example, data correlation module 212 can determine whether the event reported by the event information packets has been announced by other neighboring vehicles or whether the event is being reported for the first time. In yet another example, data correlation module 212 can determine whether the reported event is complaint with events reported by other vehicles. Further, in another example, data correlation module 212 can determine whether the reported event is coherent with information received from vehicle information packets from various other neighboring vehicles. For example, data correlation module 212 can verify whether the neighboring vehicles are slowing down by determining speed, acceleration status, and/or braking status of neighboring vehicles through their respective vehicle information packets. Additionally, the event data in the event information packet/message at issue can be compared with input from other sources, including, but not limited to sensors (e.g., LIDAR, LTE, radar and the like) of the vehicle implementing system 102.

In an aspect, based on the correlation, data correlation module 212 can further associate a reliability value with a set of data packets. Data correlation module 212 can consider a weighted combination, for example, of the above mention factors to determine a reliability value that is indicative of trustworthiness of a data packet that is received from the neighboring vehicle. Further details regarding data correlation module 212 is provided below with reference to FIGS. 7A-C.

In an aspect, based on the reliability value associated with each set of data packets, decision module 214 can make a decision regarding an action to be taken (e.g., with respect to the data packet and/or with respect to the event being reported). For example, vehicle information packets/messages or event information packets/messages falling below a predetermined or configurable threshold for trustworthiness may be discarded. Meanwhile, information/events reported by other packets/messages within a predetermined or configurable range of trustworthiness may be stored for future consideration after additional packets/messages from this source confirm the source's trustworthiness. Those packets/messages meeting or exceeding a predetermined or configurable threshold value may be considered to be associated with a valid (trusted) source and acted upon. For example, if an accident is reported in close proximity to the vehicle implementing system 102, decision module 214 can make a decision to slow down the speed of the vehicle or to alter its path when the source of the event has been found to be sufficiently trustworthy. In this manner, decision module 214 provides protection against potential malicious actors that may attempt to inject bogus packets by considering historical information regarding the source of the reported event, historical information relating to the reported event, compliance of the reported event with other events being reported by other vehicles, coherence of the reported event with information received from neighboring vehicles and consistency of event data associated with the reported event with other sources of information (e.g., LiDAR, sensors, LTE, radar and the like) to make a local determination regarding the perceived trustworthiness of received data packets before taking corresponding action for the event being reported.

According to one embodiment, historical information over time is stored within data 218, which may represent one or more databases including a current database and a temporary database. The current database contains trusted information representing a current status of an environment in which the connected car is operating, including information identifying (e.g., a networking address) the neighboring vehicles in proximity to the connected car with which the connected car has received a communication within a predetermined or configurable amount of time (e.g., 10 to 15 minutes or more, depending, for example, upon the storage constraints of the vehicle communication subsystem), information regarding a status of a road on which the connected car is driving and status information associated with the neighboring vehicles in proximity to the connected car. The status of a road on which the connected car is driving may be ascertained, for example, by extracting such information from event information packets/messages (e.g., DENMs) received from the neighboring vehicles. The status information associated with the neighboring vehicles may be ascertained, for example, by extracting such information from vehicle information packets/messages (e.g., CAMs) received from the neighboring vehicles. In one embodiment, the current database is a sliding window database, operating in a manner similar to a circular buffer. That is, the current database may be capped at a predetermined size (reflecting the amount of data expected to be stored during the predetermined or configurable amount of time) and the oldest data stored in the current database is overwritten thereafter. In another embodiment, entries in the current database may be timestamped and may be expunged upon the predetermined or configurable amount of time after the data/information contained therein was received via a vehicle information packet/message and/or an event information packet/message. The temporary database contains similar information to that contained in the current database, but the sources of such information are not yet recognized by the vehicle communication subsystem as being trusted sources of information. If and when such sources are identified as trusted sources (based upon the receipt and analysis of additional data packets form such sources), the information from the trusted source can be moved from the temporary database to the current database.

Returning to the reliability/trustworthiness value, in an embodiment, if the reliability value for any data packet is lower than a first threshold value, decision module 214 can discard the data packet. For example, while determining coherence, if data correlation module 212 determines that out of five neighboring vehicles only one vehicle reported existence of an accident at a particular location, while the other four vehicles did not report the accident location, data correlation module 212 can determine a reliability value of the data packet indicating the accident location to be 0.20, if the first threshold value is set to be 0.30, data correlation module 212 can discard the data packet.

In another embodiment, if the reliability value for a data packet is between a second threshold value and a third threshold value, decision module 214 can wait to receive additional data packets before acting on or discarding the data packet. For example, while determining coherence, if data correlation module 212 determines that out of seven neighboring vehicles three vehicles have reported a particular location of an accident, the reliability value can be determined to be 0.43, if a second threshold value is set to be 0.40 and a third threshold value is set to be 0.70, data decision module 212 can wait to receive data packets from this source and/or other neighboring vehicles before acting upon or discarding the data packet.

In an embodiment, decision module 214 can additionally receive and can factor in data packets from other sources for taking preemptive decisions for the reported event. Examples of other sources can include, but are not limited to local sensors associated with the vehicle (e.g., a RADAR system, LIDAR, a camera, and other sensors) and external sources. For example, information from vehicle information packets and event information packets can be correlated with heterogeneous information such as speed, road condition, weather, number of neighboring cars, etc. that is obtained from external sources. Thus, decision module 214 can receive and compare event information contained within a data packet received from an external sources and can fuse the received information with a determined reliability value in the data packet with heterogeneous information from other sources. Further details regarding decision module 214 is provided below with reference to FIGS. 7A-C.

Figure 3A:
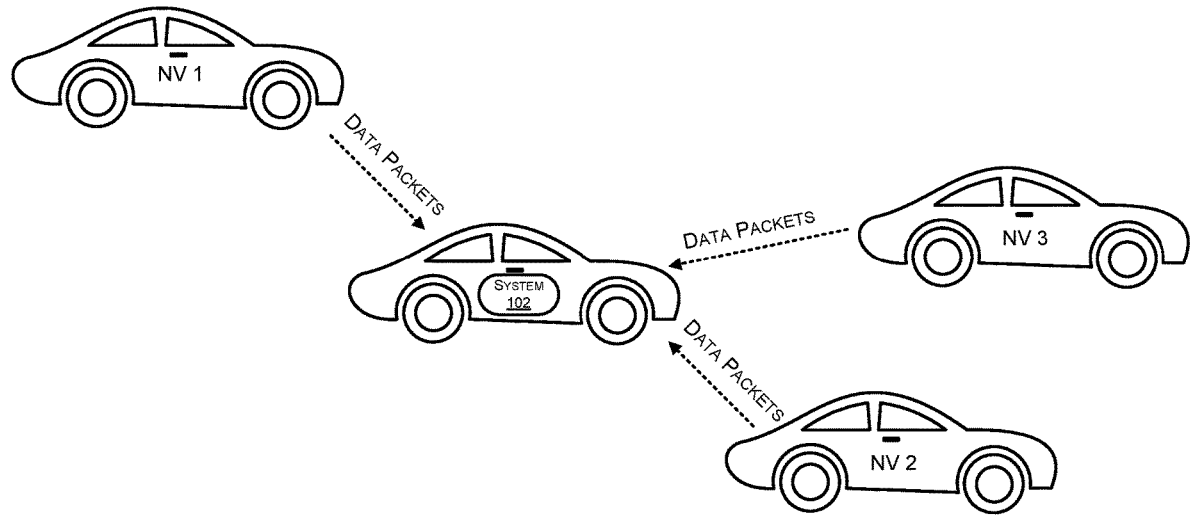
FIGS. 3A-D represent exemplary V2V communication scenarios in accordance with embodiments of the present invention.
Figure 3B:
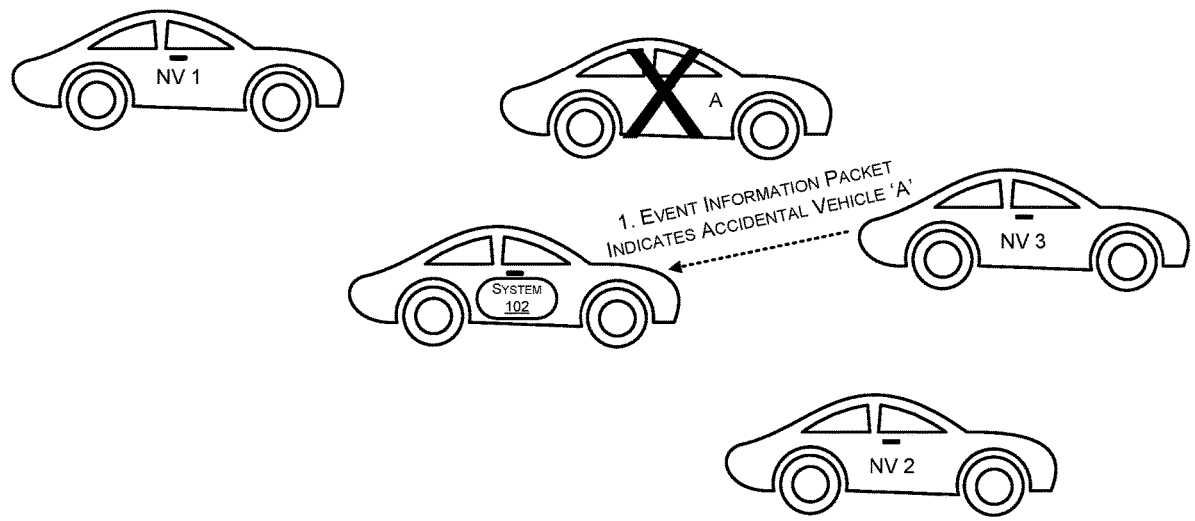
Figure 3C:
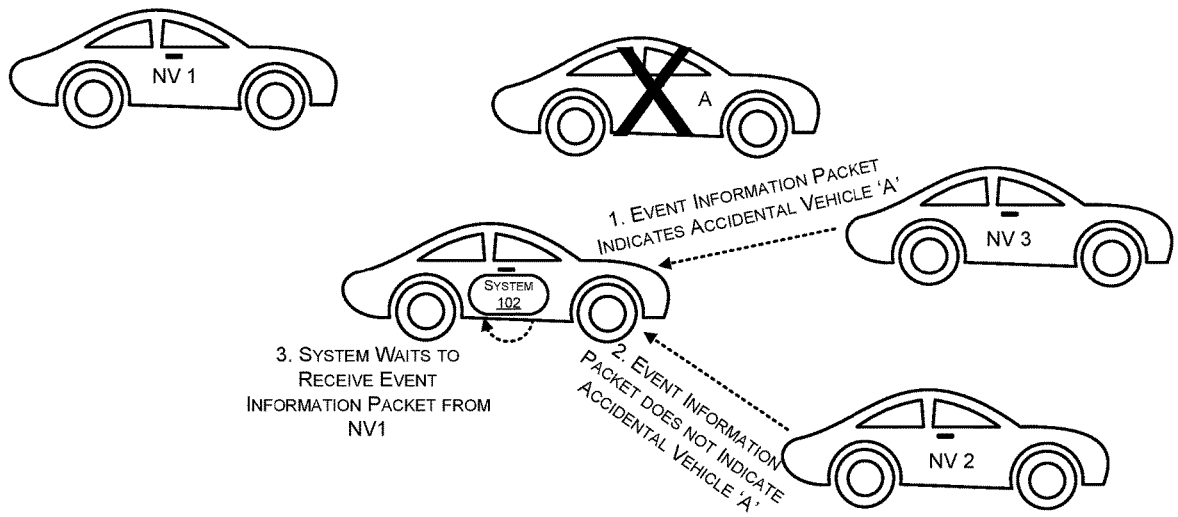
Figure 3D:
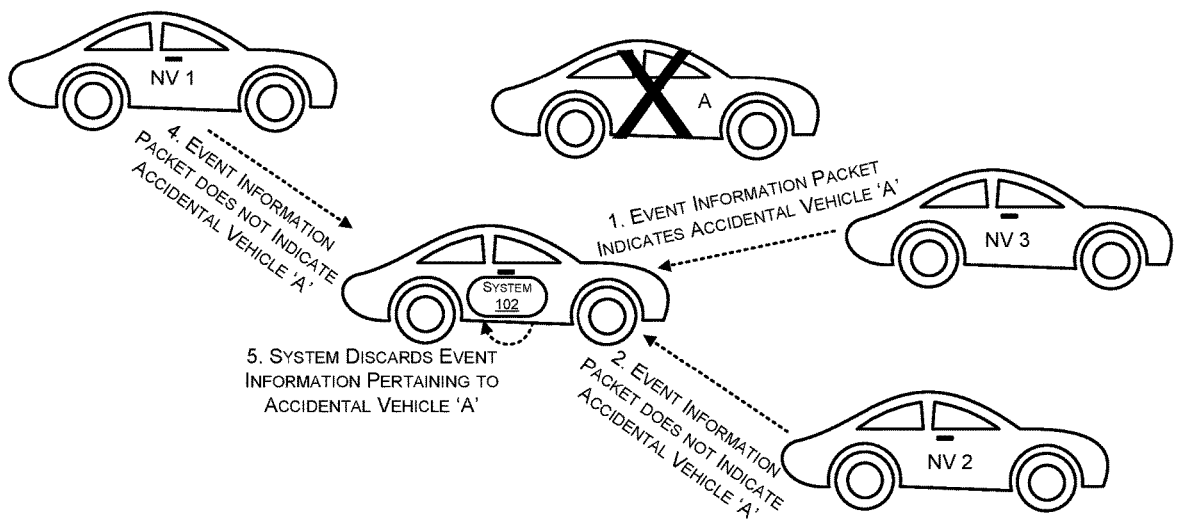

FIGS. 3A-D represent exemplary V2V communication scenarios in accordance with embodiments of the present invention. Referring to FIG. 3A, system 102 can receive data packets from presumed neighboring vehicles which are in proximity to vehicle implementing system 102 (say, NV1, NV2 and NV3). The data packets from each neighboring vehicle can include any or a combination of vehicle information packets and event information packets. According to an exemplary scenario, referring to FIG. 3B, at step 1, NV3 can send an event information packets indicating an accident (e.g., accidental vehicle A) to system 102. Referring to FIG. 3C, at step 2, data packets received from NV2 containing event information packets may not indicate accidental vehicle A. System 102 can dynamically perform analysis and by considering factors such as the number of vehicles in proximity to system 102, the number of vehicles reporting accidental location A, etc., at step 3, system 102 can wait to receive data packets from NV1 and/or additional data packets form NV3 in order to determine whether NV3 is a trusted source. Referring to FIG. 3D, at step 5, data packets received from NV1 containing event information packets may not indicate the existence of accidental vehicle A. Therefore, based on a consideration that only one neighboring vehicle out of three neighboring vehicles reported accidental location A, system 102 can determine that event information packets received from NV3 are untrustworthy. Thus, at step 5, system 102 can determine that NV3 is not a trustworthy source and can discard data packets pertaining to accidental vehicle A received from NV3. Hence, no preemptive action pertaining to accidental vehicle A would be taken by the vehicle implementing system 102.

Figure 4A:
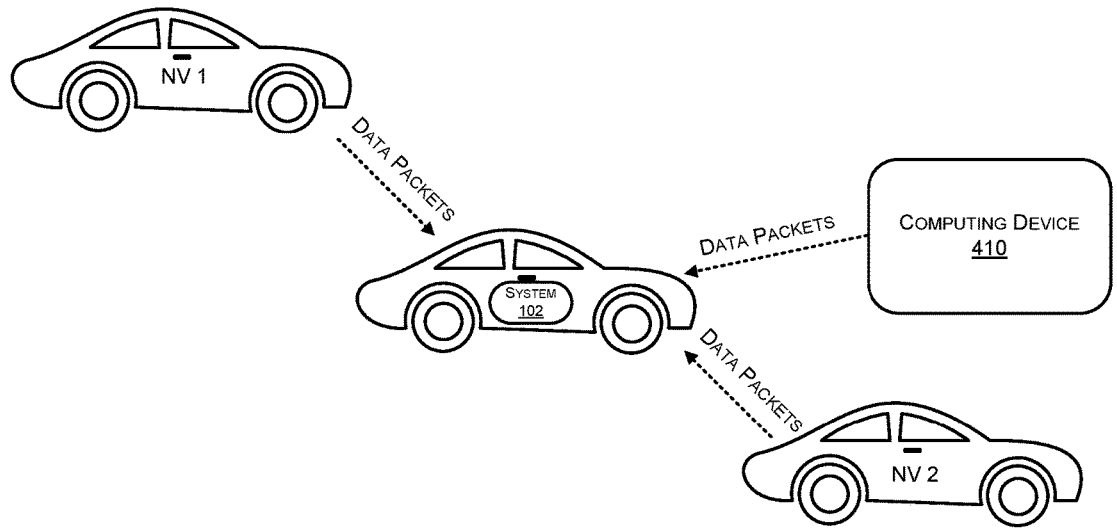
FIGS. 4A-D represent exemplary scenarios in which a malicious actor using a computing device attempts to exploit unprotected V2V communications.
Figure 4B:
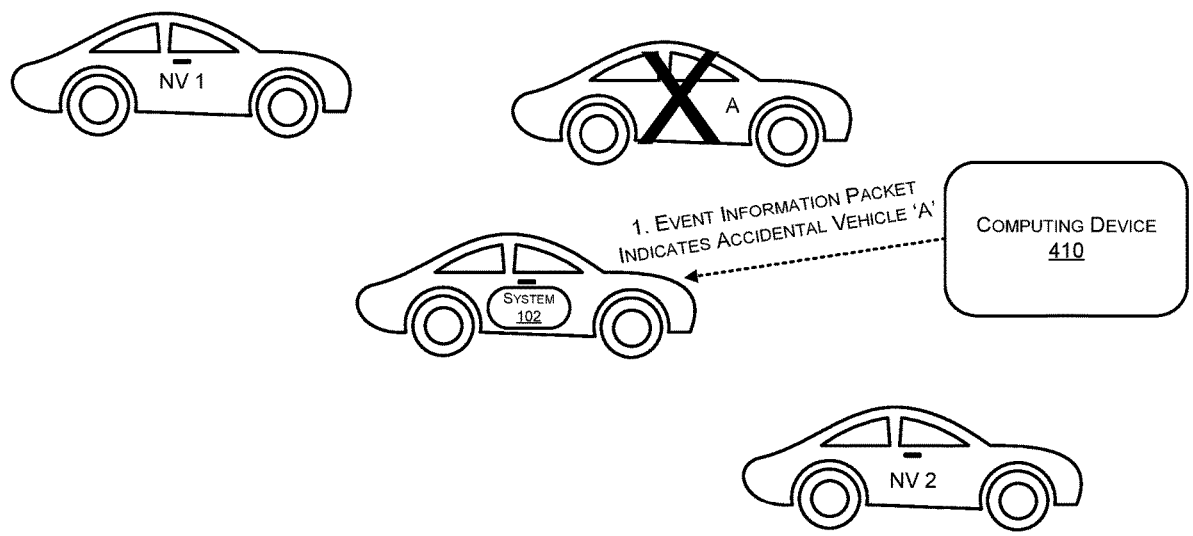
Figure 4C:
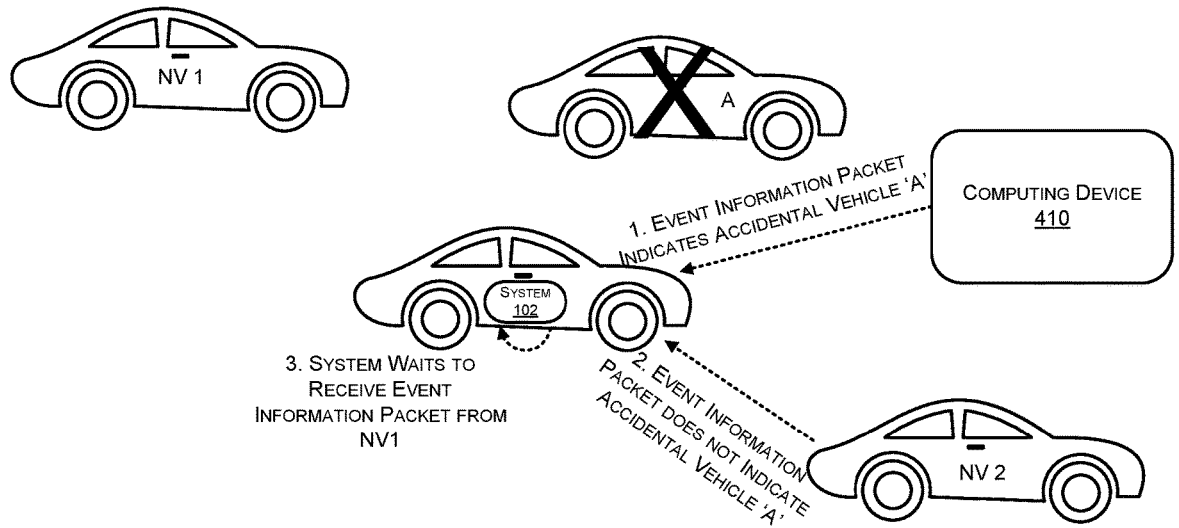
Figure 4D:
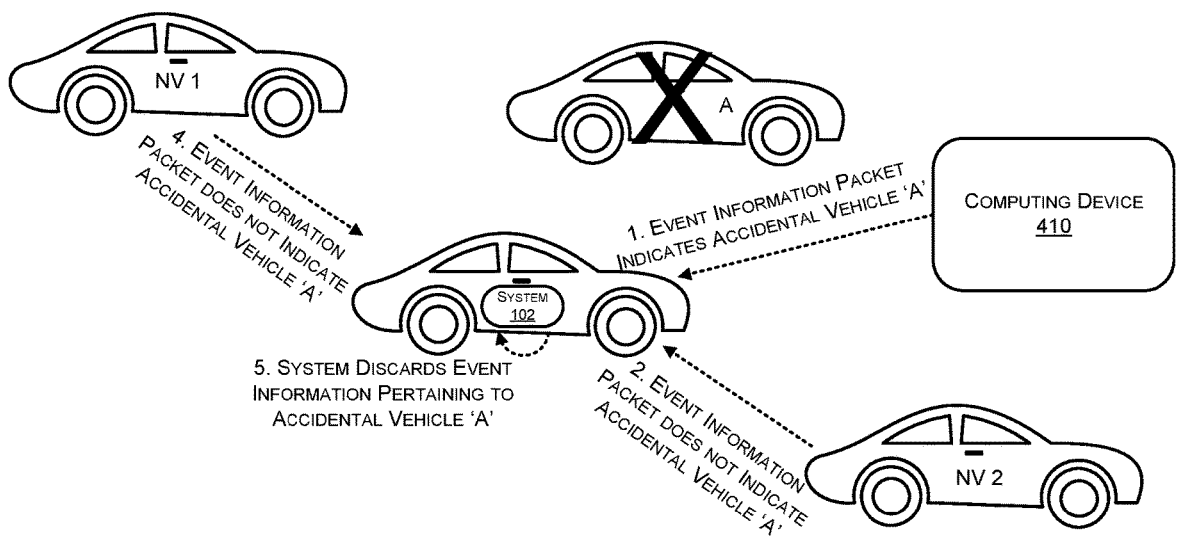

FIGS. 4A-D represent exemplary scenarios in which a malicious actor using a computing device attempts to exploit unprotected V2V communications. Referring to FIG. 4A, system 102 can receive data packets from presumed neighboring vehicles which are in proximity to vehicle implementing system 102. The presumed neighboring vehicles can include neighboring vehicles (say, NV1 and NV2) as well as a computing device 410 that can communicate and send data packets to system 102. In an exemplary scenario, Referring to FIG. 4B, at step 1, computing device 410 can send data packets including event information packets indicating an accidental vehicle A to system 102. Referring to FIG. 4C, at step 2, data packets received from NV2 containing event information packet may not indicate accidental vehicle A. Thus, at step 3, system 102 can wait to receive additional data packets from NV1 and/or computing device 410 in order to determine whether computing device 410 is a trusted source. Referring to FIG. 4D, at step 5, data packets received from NV1 containing event information packet may not indicate accidental vehicle A. Therefore, based on the fact that only one out of three sources indicated accidental vehicle A, at step 5, system 102 can determine that computing device 410 is not a trustworthy source (e.g., a potential malicious actor) and can discard data packets pertaining to accidental vehicle A received from computing device 410. Hence, no preemptive decision pertaining to accidental vehicle A is taken by system 102.

Figure 5A:
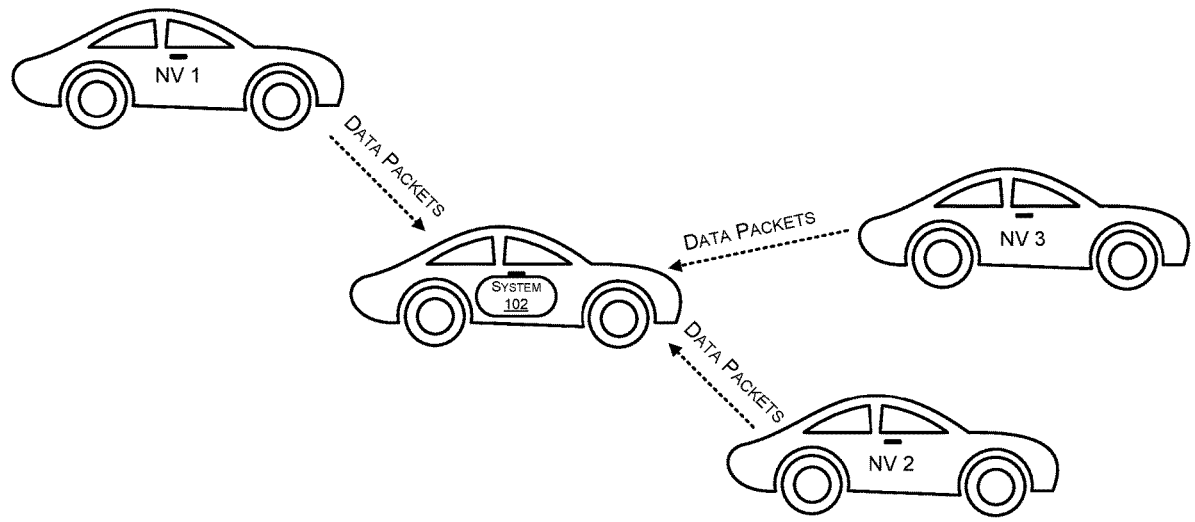
FIGS. 5A-D represent additional exemplary V2V communication scenarios in accordance with embodiments of the present invention.
Figure 5B:
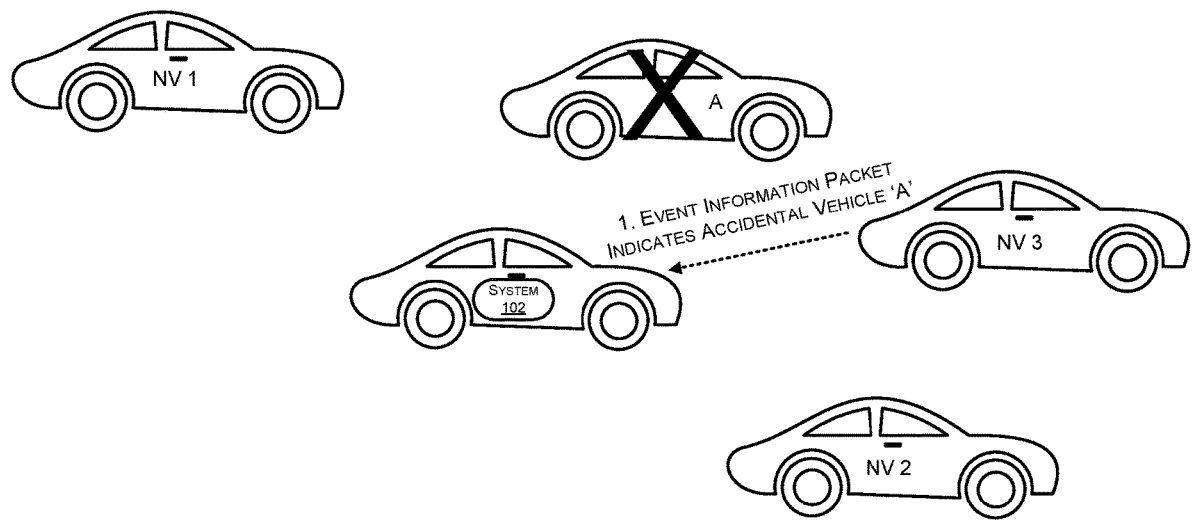
Figure 5C:
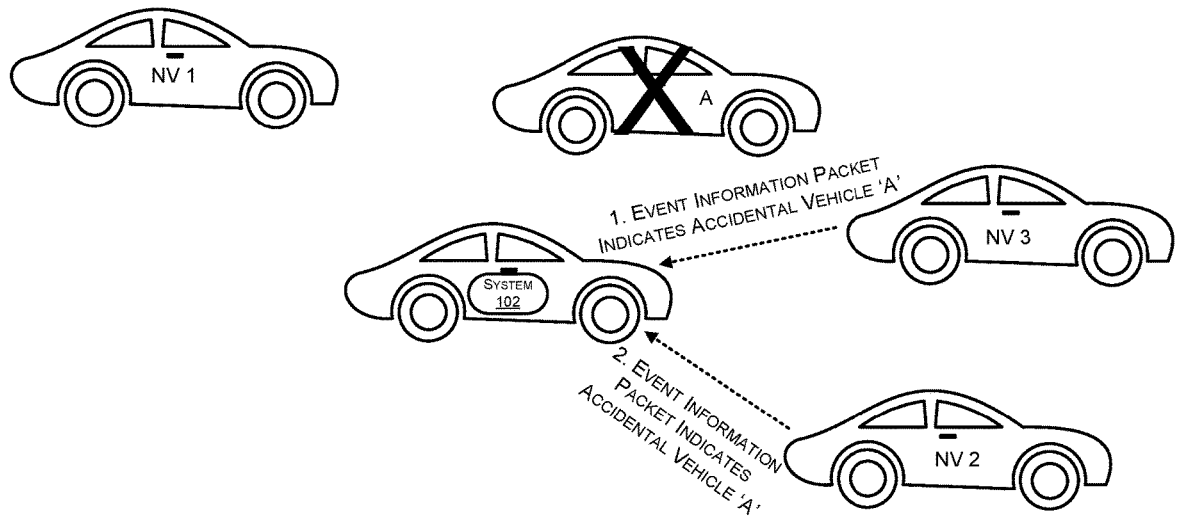
Figure 5D:
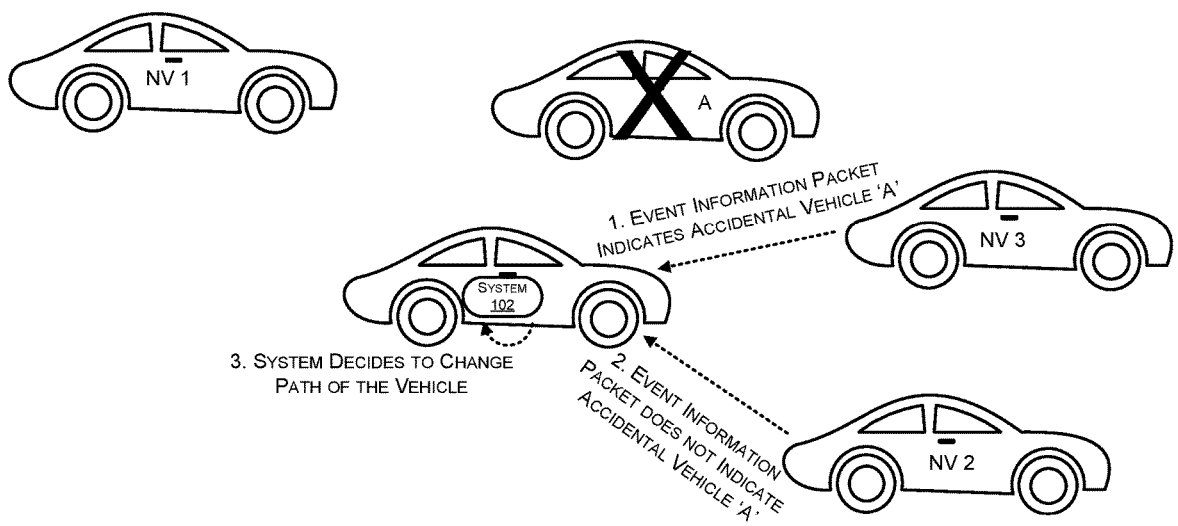

FIGS. 5A-D represent additional exemplary V2V communication scenarios in accordance with embodiments of the present invention. Referring to FIG. 5A, system 102 can receive data packets from presumed neighboring vehicles which are in proximity to vehicle implementing system 102 (say, NV1, NV2 and NV3). In an exemplary scenario, referring to FIG. 5B, at step 1, NV3 can send a data packet representing an event information packet indicating an accidental vehicle A to system 102. Referring to FIG. 5C, at step 2, data packets received from NV2 containing event information packets may also indicate accidental vehicle A. Based on the fact that there are three neighboring vehicles and two neighboring vehicles have reported accidental vehicle A, system 102 would not wait for additional data packets from NV1 to determine its trustworthiness. Therefore, referring to FIG. 5D, at step 5, system 102 would make a preemptive decision and would alter path of the vehicle implementing system 102, for example.

Figure 6:
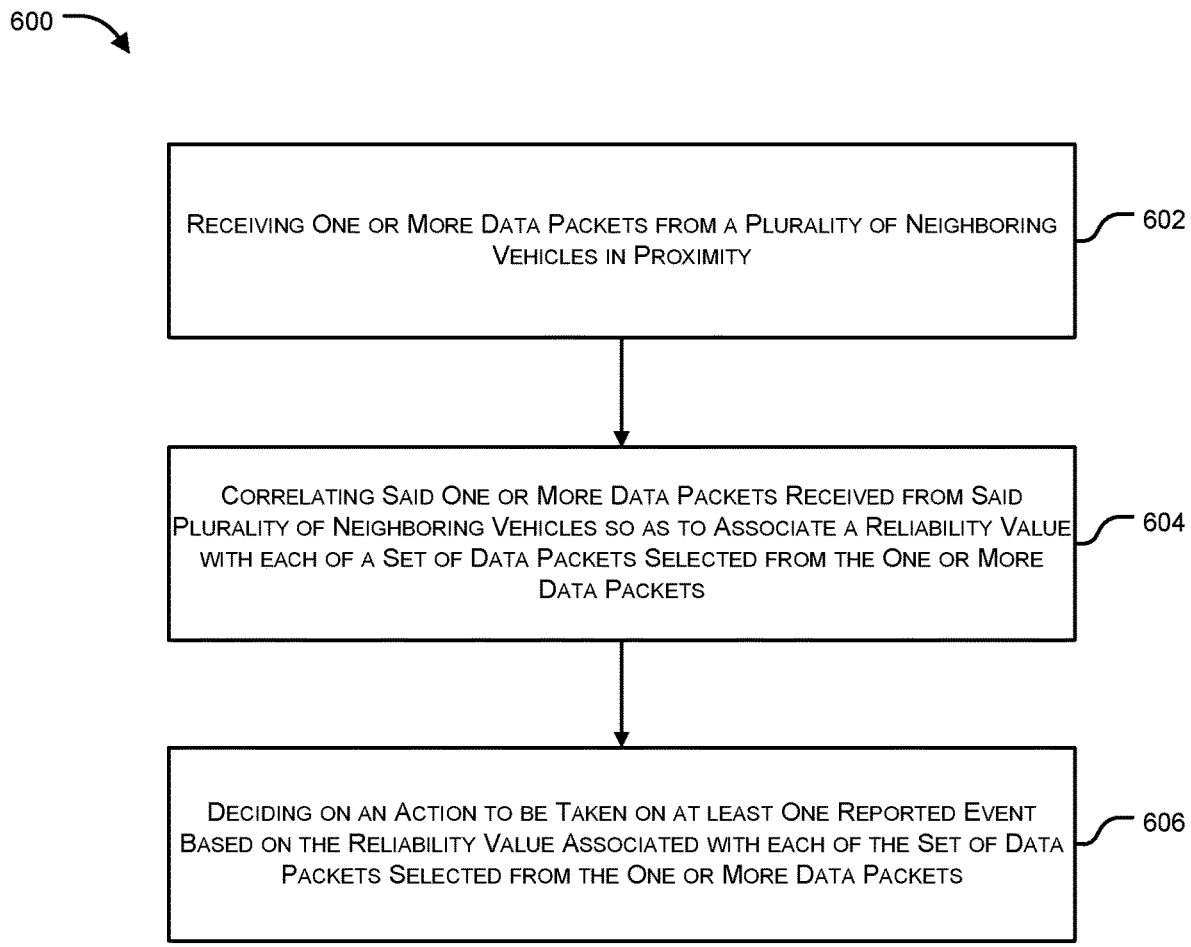
FIG. 6 is a flow diagram illustrating a process for deciding on an action to be taken based on the reliability of received V2V data packets in accordance with an embodiment of the present invention.

FIG. 6 is a flow diagram 600 illustrating a process for deciding on an action to be taken based on the reliability of received V2V data packets in accordance with an embodiment of the present invention.

In context of the present example, at block 602, one or more data packets are received from multiple presumed neighboring vehicles. The received data packets include vehicle information packets, such as CAMs, and event information packets, such as DENMs. The vehicle information packets indicate attributes of respective neighboring vehicles such as GPS coordinates, acceleration, path history, dimensions, speed, direction, etc. of the respective neighboring vehicles, while, event information packets indicate parameters pertaining to at least one event reported by a neighboring vehicle such as location of the event, type of the event, proximity area affected by the event, etc.

At block 604, the received data packets are correlated so as to associate a reliability value with each of a set of data packets that is selected from the received data packets. For example, a reliability value of a first data packet received from the first presumed neighboring vehicle can be determined based on coherence between information received in the first data packet and information received from data packets of other presumed neighboring vehicles, trustworthiness of the first neighboring vehicle as a source of information, and reliability of vehicle information packets received the first presumed neighboring vehicle.

In an embodiment, if the reliability value of a data packet is determined to be lower than a first threshold value, then the data packet is discarded. In another embodiment, if the reliability value for a data packet is between a second and third threshold values, additional data packets are received before acting on or discarding the data packet.

At block 606, an action to be taken can be decided based on the reliability value associated with each set of data packets. Further, to make an appropriate decision, information received through data packets from other sources (e.g., local and/or external sources) can be considered and fused with vehicle information packets and event information packets. Examples of other sources include, but are not limited to, RADAR, LIDAR, a sensor, a camera, and the like.

Figure 7A:
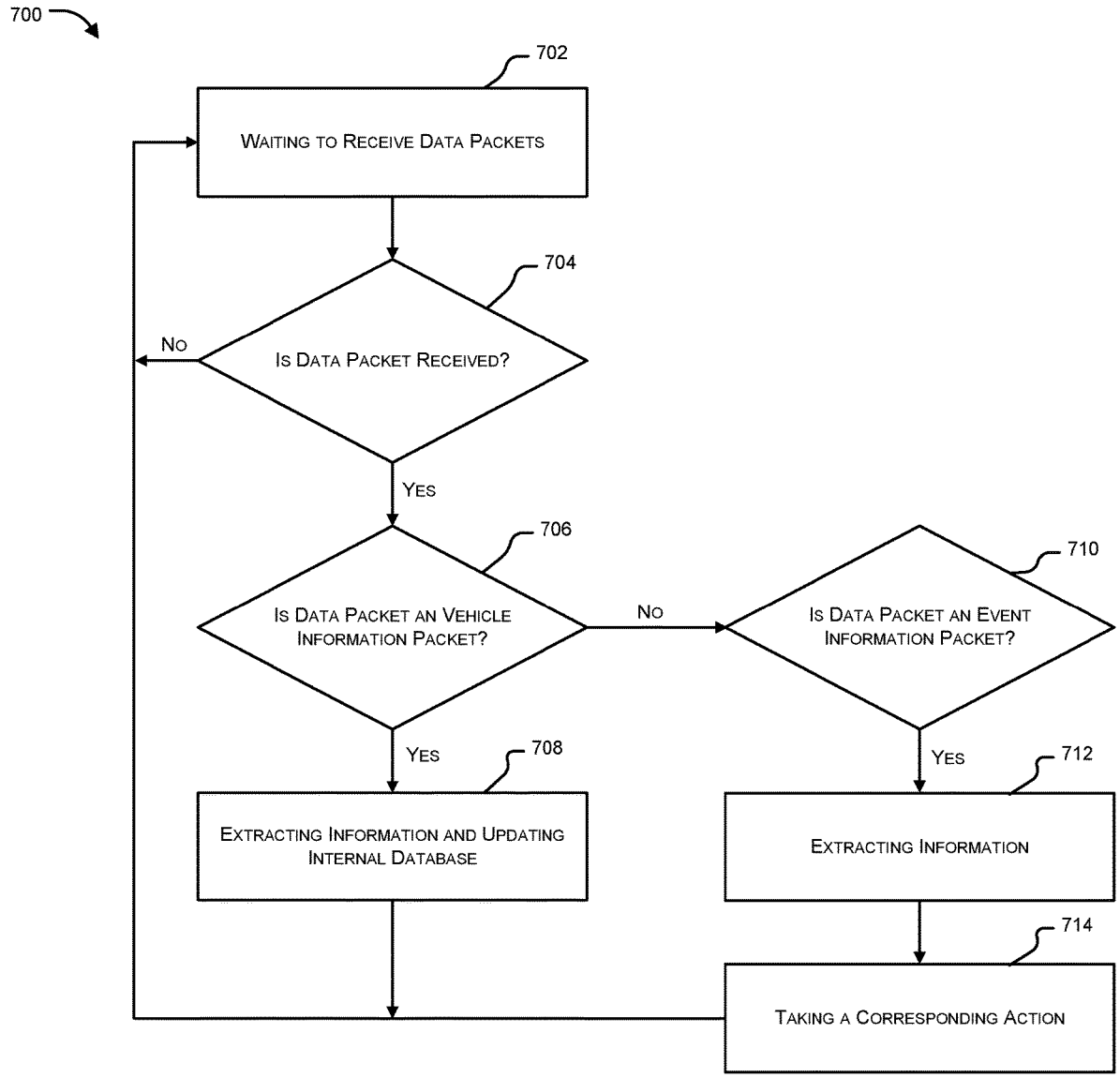
FIG. 7A is a flow diagram illustrating prior art V2V packet processing.

FIG. 7A is a flow diagram illustrating prior art V2V packet processing. At block 702, prior art systems wait to receive a data packet from a neighboring vehicle. At decision block 704, a determination is made regarding whether a data packet has been received. When a data packet is determined to have been received, at decision block 706, a determination is made regarding whether the data packet is a vehicle information packet. If the data packet is a vehicle information packet, at block 708, the attributes of the neighboring vehicle such as GPS coordinates, acceleration, path history, dimensions, speed, direction, etc. can be obtained and updated within an internal database. Alternatively, if the data packet is not a vehicle information packet, at decision block 710, data correlation module 210 can determine whether the data packet is an event information packet. If the data packet is an event information packet, at block 712, the event parameters (e.g., location of the event, type of the event, the area affected by the event, and the like) can be extracted by data correlation module 212. Finally, based on the extracted information at block 712 and block 708 and without any consideration with regard to the trustworthiness of the received data packet, an action is taken based on the received data packet at block 714.

Figure 7B:
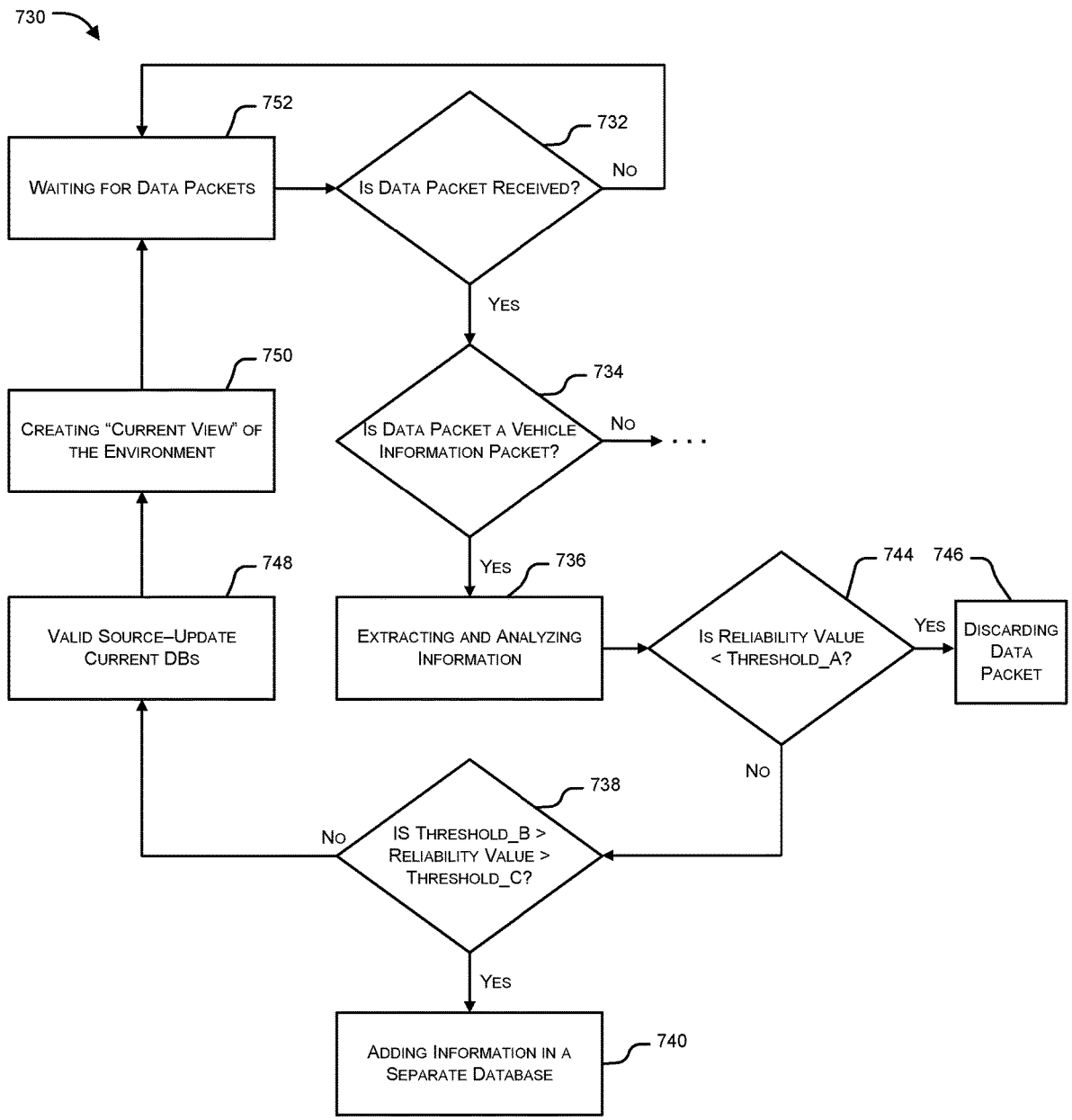
FIGS. 7B-C are flow diagrams illustrating decision module processing in accordance with an embodiment of the present invention.
Figure 7C:
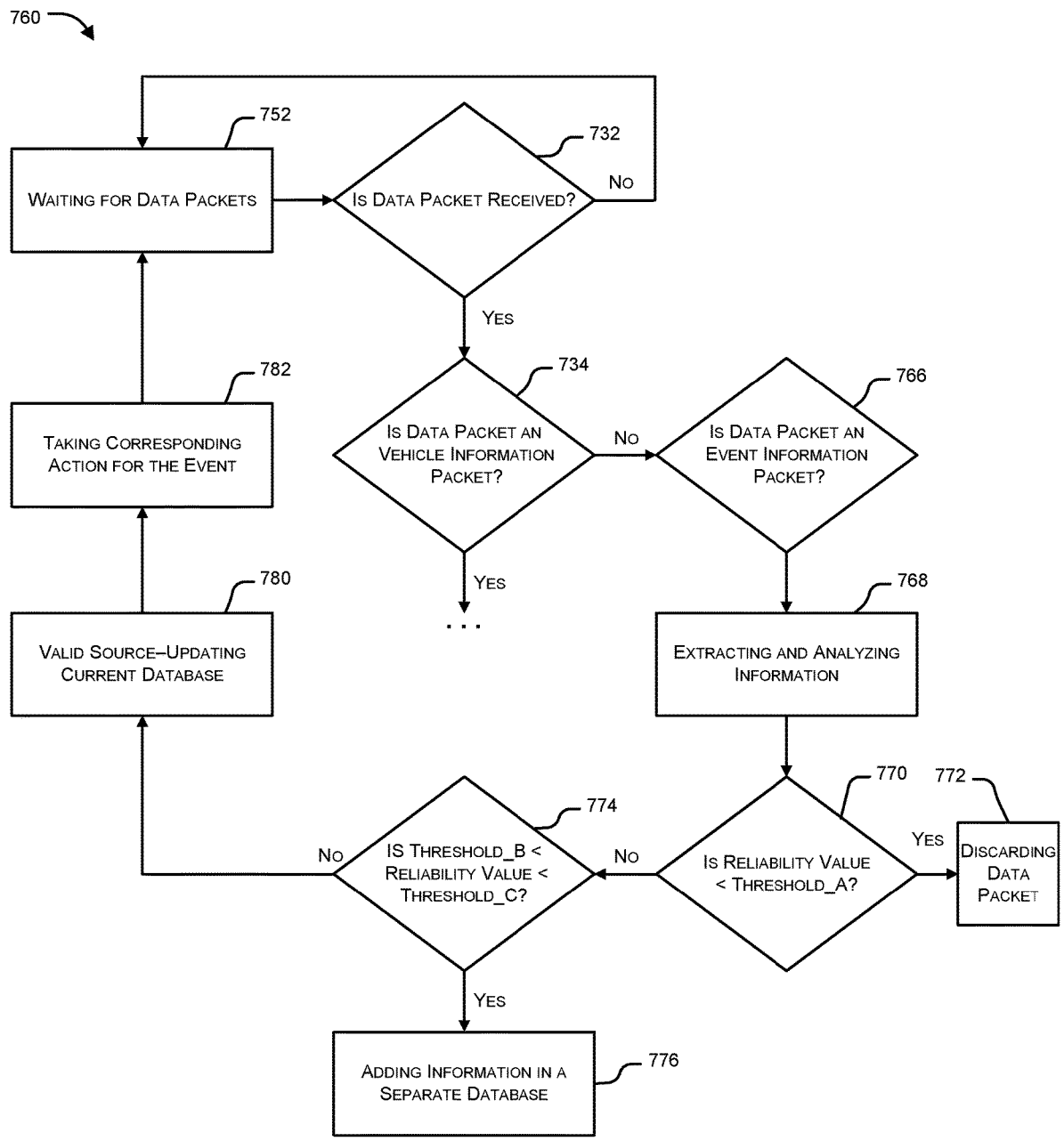

FIGS. 7B-C are flow diagrams 730 and 760 illustrating decision module processing in accordance with an embodiment of the present invention.

Referring now to exemplary flow diagram 730 of FIG. 7B, it includes a security algorithm to evaluate the trustworthiness of received data packets (e.g., vehicle information packets/messages) for purposes of determining whether the source from which a received data packet is a valid (trustworthy) source and whether to incorporate information extracted from the received data packet into the vehicle's current view or model of its surrounding environment. At block 752, system 102 waits to receive a data packet from a neighboring vehicle. At decision block 732, data receive module 210 can determine whether a data packet has been received or not. When a data packet has been received, at decision block 734, data correlation module 210 can determine whether the data packet is a vehicle information packet. If the data packet is a vehicle information packet, at block 736, data correlation module 212 can determine and analyze the attributes of the neighboring vehicle, including, but not limited to GPS coordinates, acceleration, path history, dimensions, speed, direction, etc.

For trustworthiness analysis, data correlation module 212 can consider various factors. In one embodiment, the trustworthiness value, representing or indicative of a likelihood that the source (purportedly representing a neighboring vehicle in proximity to the connected car) from which the vehicle information packet (e.g., a heartbeat packet or a CAM) at issue was received is a trusted source can be generally evaluated based on the source and coherence of the vehicle information packet with local information (e.g., historical information within the current database and/or map information) maintained by the connected car.

In one embodiment, one or more of four factors (e.g., factors A-D) are employed. One or more of the four factors can be independently assigned trustworthiness values, potentially weighted and aggregated or summed to arrive at a final trustworthiness value. Factor A can pertain to whether the data packet is from a new neighboring vehicle (e.g., one from which it has not received a heartbeat packet during a predetermined or configurable timeframe as determined with reference to a sliding window current database maintained by the vehicle communication subsystem) or an existing neighboring vehicle (e.g., one from which it has received a heartbeat packet during the predetermined or configurable timeframe). Factor B can pertain to a degree of coherence of the reported vehicle position and its path history with map information maintained by the connected car. Factor C can pertain to degree of coherence of information contained in the vehicle information packet with the connected car's current view (e.g., data packets received previously by other neighboring vehicles—e.g., whether other neighboring vehicles are slowing down or a scenario in which the road is not crowded and constant speed is allowed) of the environment in which it is operating. Factor D can pertain to correlation of the vehicle or event information extracted from the received data packet with heterogeneous information obtained from other sources associated with the connected car, including, but not limited to LIDAR, cameras, radar or other sensors. All or various subsets of the above mentioned factors can be weighted and aggregated/fused together to determine a reliability/trustworthiness value of the data packet and/or the source of the data packet.

At decision block 744, decision module 214 can compare the determined reliability value with a first threshold (say, threshold A). When the reliability value is less than threshold A, at block 746, the data packet can be discarded as untrustworthy. When the reliability value is greater than or equal to the first threshold, at decision block 738, decision module 214 can further evaluate whether the reliability value is between a second threshold (say, threshold B) and a third threshold (say, threshold C). If the reliability value is between threshold B and threshold C, at block 740, the information pertaining to the data packet can be stored in a separate database (e.g., the temporary database) and system 102 can wait to receive more data packets from this source or other neighboring vehicles in order to evaluate the trustworthiness of the source. If the reliability value is not between threshold B and threshold C, it means the reliability value is high, thus block 748 indicates that the data packet is from a valid (trusted) source. Thus, at block 750, decision module 214 creates or update its "current view" of the environment for seamless drivability of vehicle implementing system 102 and continue processing additional received data packets.

Referring now to exemplary flow diagram 760 of FIG. 7C, it includes a security algorithm to evaluate the trustworthiness of received data packets (e.g., event information packets/messages) for purposes of determining whether the source from which a received data packet is a valid (trustworthy) source and whether to take a corresponding action based on the reported event. Blocks 752 and 732 are the same as the corresponding blocks of FIG. 7B. At decision block 734, if the received data packet is determined not to be a vehicle information packet, at decision block 766, data correlation module determines whether the data packet is an event information packet. If the data packet is an event information packet, at block 768, data correlation module 212 can determine and analyze the information associated with the reported event (e.g., the location of the event, the type of event, the area affected by the event, etc.)

For trustworthiness analysis of an event information packet (e.g., a DENM) at issue, data correlation module 212 can consider various factors. In one embodiment, the trustworthiness value, representing or indicative of a likelihood that the source (purportedly representing a neighboring vehicle in proximity to the connected car) from which the event information packet was received is a trusted source can be generally evaluated based on the source and coherence of the event information packet with local information (e.g., historical information within the current database) maintained by the vehicle connectivity subsystem.

In one embodiment one or more of five factors (e.g., factors A-E) are employed. One or more of the five factors can be independently assigned trustworthiness values, potentially weighted and aggregated or summed to arrive at a final trustworthiness value. Subsets. Factor A can pertain to whether the event information packet is from a new neighboring vehicle (e.g., one from which it has not received a heartbeat packet during a predetermined or configurable timeframe as determined with reference to a sliding window current database maintained by the vehicle communication subsystem) or an existing neighboring vehicle (e.g., one from which it has received a heartbeat packet during the predetermined or configurable timeframe). Factor B can pertain to whether the event associated with (being reported by) the event information packet has previously been reported by other of the neighboring vehicles in proximity to the connected car within a predetermined timeframe or whether it is the first time within the predetermined timeframe that the event has been reported and a value can be assigned to factor B based thereon. Factor C can be assigned a value based on a degree of consistency of data regarding the event contained within the event information packet with other events reported by other vehicles (e.g., one or more of the reported events contained in the current database). Factor D can pertain to a degree of coherence of the event reported in the event information packet with attributes of neighboring vehicles obtained from vehicle information packets received previously from other neighboring vehicles (e.g., coherence of the reported event with one or more attributes of neighboring vehicles as stored in the current database, for example, cars in proximity are slowing down). Factor E can pertain to correlation of the vehicle or event information extracted from the received data packet with heterogeneous information obtained from other sources associated with the connected car, including, but not limited to LIDAR, cameras, radar or other sensors. All or various subsets of the above mentioned factors can be weighted and aggregated/fused together to determine a reliability/trustworthiness value of the data packet and/or the source of the data packet.

At decision block 770, decision module 214 can compare the determined reliability value with threshold A. If the reliability value is less than threshold A, at block 772, the data packet can be discarded as untrustworthy. At decision block 774, decision module 214 can determine whether the reliability value is between threshold B and threshold C. If the reliability value is between threshold B and threshold C, at block 776, the event information pertaining to the data packet can be stored in a separate database (e.g., the temporary database) and system 102 can wait to receive more data packets in order to make a decision on the reported event and/or regarding whether this source is to be considered trusted. If the reliability value is not between threshold B and threshold C, it means the reliability value is high, thus block 780 indicates that the data packet is from a valid source. Thus, at block 782, the decision module 214 can safely make an appropriate decision (e.g., slowing down or altering the path) based on the reported event in the received data packet.

According to an exemplary implementation a vehicle can be configured to make a decision based on the locally determined reliability of received data packets, the vehicle can include a non-transitory storage device having embodied therein one or more routines operable to make the decision based on reliability of received data packets, and one or more processors coupled to the non-transitory storage device and operable to execute the one or more routines, wherein the one or more routines can include a data receive module to receive one or more data packets from a plurality of presumed neighboring vehicles in proximity, the one or more received data packets including vehicle information packets indicative of attributes of the plurality of respective neighboring vehicles, and at least one event information packet indicative of parameters pertaining to at least one event reported by a first neighboring vehicle of said plurality of presumed neighboring vehicles, a data correlation module to correlate the one or more data packets received from the plurality of presumed neighboring vehicles so as to associate a reliability value with each of a set of data packets selected from the one or more data packets, the reliability value of a first data packet received from the first presumed neighboring vehicle being determined based on coherence between information received in the first data packet and information received from data packets of other presumed neighboring vehicles, trustworthiness of said first neighboring vehicle, and reliability of vehicle information packets received from the first presumed neighboring vehicle, and a decision module to make the decision on an action to be taken based on the reliability value associated with each of the set of data packets selected from the one or more data packets.

Figure 8:
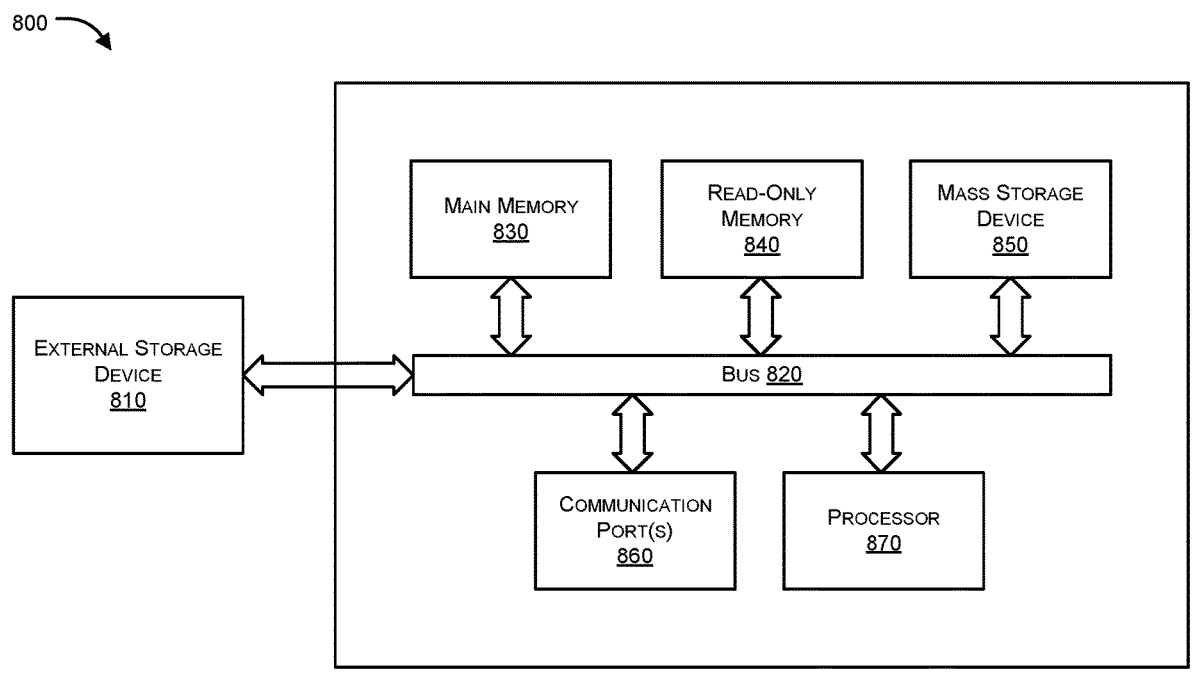
FIG. 8 illustrates an exemplary computer system in which or with which embodiments of the present invention may be utilized.

FIG. 8 illustrates an exemplary computer system in which or with which embodiments of the present invention may be utilized. As shown in FIG. 8, computer system includes an external storage device 810, a bus 820, a main memory 830, a read only memory 840, a mass storage device 850, communication port 860, and a processor 870. Computer system may represent a part of system 102.

Those skilled in the art will appreciate that computer system 800 may include more than one processor 870 and communication ports 860. Examples of processor 870 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 870 may include various modules associated with embodiments of the present invention.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g., start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 1020 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
receiving, by one or more processors of a vehicle connectivity subsystem of a connected car, a vehicle information packet indicative of one or more attributes of a source of a plurality of sources from which the vehicle information packet was received, wherein the plurality of sources purportedly represent neighboring vehicles in proximity to the connected car;
determining, by the one or more processors, a trustworthiness value for the vehicle information packet based on the source and coherence of the vehicle information packet with local information maintained by the connected car, wherein the trustworthiness value is indicative of a likelihood that the source represents a neighboring vehicle in proximity to the connected car from which communications are to be trusted;
determining, by the one or more processors, an action to be taken by the vehicle connectivity subsystem with respect to the source or the vehicle information packet based on the trustworthiness value; and
causing, by the one or more processors, the determined action to be taken by the vehicle connectivity subsystem.

2. The method of claim 1, wherein said determining, by the one or more processors, a trustworthiness value for the vehicle information packet comprises:
identifying whether the source represents a new source with which the vehicle connectivity subsystem has not previously communicated within a predetermined timeframe or an existing source with which the vehicle connectivity subsystem has previously communicated within the predetermined timeframe;
responsive to identifying the source as the new source, assigning a first value to a first weighting factor;
responsive to identifying the source as the existing source, assigning a second value to the first weighting factor based on a verification of historical information received from the source and maintained in a current database by the vehicle connectivity subsystem, wherein the current database contains trusted information representing a current status of an environment in which the connected car is operating, including a status of a road on which the connected car is driving and status information associated with the neighboring vehicles in proximity to the connected car;
determining a degree of coherence of data regarding vehicle position and path history contained within the vehicle information packet with map information maintained by the connected car and assigning a third value to a second weighting factor based on the determined degree of coherence; and setting the trustworthiness value based on at least the first weighting factor and the second weighting factor.

3. The method of claim 2, wherein said causing, by the one or more processors, the determined action to be taken by the vehicle connectivity subsystem comprises one or more of:
causing the vehicle connectivity subsystem to wait for additional data packets from the source before considering it as a trusted source;
causing the vehicle connectivity subsystem to drop the vehicle information packet; and
causing the vehicle connectivity subsystem to update the current database by incorporating information extracted from the vehicle information packet into the current database.

4. The method of claim 2, further comprising:
measuring a degree of coherence of information contained in the vehicle information packet with corresponding information previously received from other of the plurality of sources, including verifying the information contained in the vehicle information packet with reference the current status of the environment as represented within the current database;
assigning a forth value to a third weighting factor based on the measured degree of coherence; and
wherein said setting the trustworthiness value additionally includes incorporating the third weighting factor.

5. The method of claim 4, further comprising:
correlating the information contained in the vehicle information packet with heterogeneous data available from one or more sources other than the plurality of sources and assigning a fifth value to a forth weighting factor based on said correlating; and
wherein said setting the trustworthiness value additionally includes incorporating the forth weighting factor.

6. The method of claim 1, wherein said determining, by the one or more processors, an action to be taken with respect to the source or the vehicle information packet based on the trustworthiness value comprises:
comparing the trustworthiness value to a first threshold; and
responsive to the trustworthiness value being less than the first threshold, discarding the vehicle information packet.

7. The method of claim 6, further comprising:
when the trustworthiness value is greater than or equal to the first threshold:
comparing the trustworthiness value to a second threshold and a third threshold; and
responsive to the trustworthiness value being between the second threshold and the third threshold, adding information extracted from the vehicle information packet to a temporary database and waiting for additional vehicle information packets from the source before considering it as a trusted source.

8. The method of claim 7, further comprising responsive to the trustworthiness value being greater than or equal to the third threshold, adding the information extracted from the vehicle information packet to a current database maintained by the vehicle connectivity subsystem that contains trusted information representing a current status of an environment in which the connected car is operating, including a status of a road on which the connected car is driving and status information associated with the neighboring vehicles in proximity to the connected car.

9. The method of claim 1, wherein the attributes include information regarding one or more of Global Positioning System (GPS) coordinates, acceleration, path history, dimensions, speed and direction.

10. The method of claim 1, wherein the vehicle information packet comprises a Cooperative Awareness Message (CAM).

11. The method of claim 1, wherein the one or more other sources are selected from any or a combination of a radio detection and ranging (RADAR) system, light detection and ranging (LIDAR), a sensor, and a camera associated with the connected car.

12. A method comprising:
receiving, by one or more processors of a vehicle connectivity subsystem of a connected car, an event information packet indicative of an event that has potential impact on road safety or traffic conditions from a source of a plurality of sources, wherein the plurality of sources purportedly represent neighboring vehicles in proximity to the connected car;
determining, by the one or more processors, a trustworthiness value for the event information packet based on the source and coherence of the event information packet with local information maintained by the connected car, wherein the trustworthiness value is indicative of a likelihood that the source represents a neighboring vehicle in proximity to the connected car from which communications are to be trusted;
determining, by the one or more processors, an action to be taken by the vehicle connectivity subsystem with respect to the source or the event information packet based on the trustworthiness value; and
causing, by the one or more processors, the determined action to be taken by the vehicle connectivity subsystem.

13. The method of claim 12, wherein said determining, by the one or more processors, a trustworthiness value for the event information packet comprises:
identifying whether the source represents a new source with which the vehicle connectivity subsystem has not previously communicated within a predetermined timeframe or an existing source with which the vehicle connectivity subsystem has previously communicated within the predetermined timeframe;
responsive to identifying the source as the new source, assigning a first value to a first weighting factor;
responsive to identifying the source as the existing source, assigning a second value to the first weighting factor based on a verification of historical information received from the source and maintained in a current database by the vehicle connectivity subsystem, wherein the current database contains trusted information representing a current status of an environment in which the connected car is operating, including reported events by one or more of the neighboring vehicles in proximity to the connected car and status information associated with the neighboring vehicles in proximity to the connected car;
determining whether the event associated with the event information packet has previously been reported by other of the neighboring vehicles in proximity to the connected car within a predetermined timeframe and assigning a third value to a second weighting factor based thereon; and
setting the trustworthiness value based on at least the first weighting factor and the second weighting factor.

14. The method of claim 13, wherein said causing, by the one or more processors, the determined action to be taken by the vehicle connectivity subsystem comprises one or more of:
  causing the vehicle connectivity subsystem to wait for additional data packets from the source before considering it as a trusted source;
  causing the vehicle connectivity subsystem to drop the event information packet; and
  causing the vehicle connectivity subsystem to update the current database by incorporating information extracted from the event information packet into the current database.

15. The method of claim 13, further comprising:
  determining a degree of consistency of data regarding the event contained within the event information packet with one or more of the reported events contained in the current database and assigning a forth value to a third weighting factor based on the degree of consistency; and
  wherein said setting the trustworthiness value additionally includes incorporating the third weighting factor.

16. The method of claim 15, further comprising:
  determining a degree of coherence of the data regarding the event contained within the event information packet with one or more vehicle information packets received from one or more sources of the plurality of sources and indicative of one or more attributes of the one or more sources from which the vehicle information packet was received and assigning a fifth value to a forth weighting factor based on the degree of coherence; and
  wherein said setting the trustworthiness value additionally includes incorporating the forth weighting factor.

17. The method of claim 16, further comprising:
  correlating the information contained in the event information packet with heterogeneous data available from one or more sources other than the plurality of sources and assigning a sixth value to a fifth weighting factor based on said correlating; and
  wherein said setting the trustworthiness value additionally includes incorporating the fifth weighting factor.

18. The method of claim 12, wherein said determining, by the one or more processors, an action to be taken with respect to the source or the event information packet based on the trustworthiness value comprises:
  comparing the trustworthiness value to a first threshold; and
  responsive to the trustworthiness value being less than the first threshold, discarding the event information packet.

19. The method of claim 18, further comprising:
  when the trustworthiness value is greater than or equal to the first threshold:
    comparing the trustworthiness value to a second threshold and a third threshold; and
    responsive to the trustworthiness value being between the second threshold and the third threshold, adding information extracted from the event information packet to a temporary database and waiting for additional data packets from the source before considering it as a trusted source.

20. The method of claim 19, further comprising responsive to the trustworthiness value being greater than or equal to the third threshold, adding the information extracted from the event information packet to a current database maintained by the vehicle connectivity subsystem that contains trusted information representing a current status of an environment in which the connected car is operating, including reported events by one or more of the neighboring vehicles in proximity to the connected car and status information associated with the neighboring vehicles in proximity to the connected car.

21. The method of claim 16, wherein the one or more attributes include information regarding one or more of Global Positioning System (GPS) coordinates, acceleration, path history, dimensions, speed and direction and wherein the one or more vehicle information packets comprise Cooperative Awareness Messages (CAMs).

22. The method of claim 12, wherein the one or more other sources are selected from any or a combination of a radio detection and ranging (RADAR) system, light detection and ranging (LIDAR), a sensor, and a camera associated with the connected car.

23. The method of claim 12, wherein the event information packet comprises a Decentralized Environmental Notification Message (DENM).

24. A vehicle connectivity system of a connected car, the system comprising:
  a non-transitory storage device having embodied therein instructions; and
  one or more processors coupled to the non-transitory storage device and operable to execute the instructions to perform a method comprising:
    receiving a vehicle information packet indicative of one or more attributes of a source of a plurality of sources from which the vehicle information packet was received, wherein the plurality of sources purportedly represent neighboring vehicles in proximity to the connected car;
    determining a trustworthiness value for the vehicle information packet based on the source and coherence of the vehicle information packet with local information maintained by the connected car, wherein the trustworthiness value is indicative of a likelihood that the source represents a neighboring vehicle in proximity to the connected car from which communications are to be trusted;
    determining an action to be taken by the vehicle connectivity system with respect to the source or the vehicle information packet based on the trustworthiness value; and
    causing the determined action to be taken by the vehicle connectivity system.

25. The system of claim 24, wherein said determining a trustworthiness value for the vehicle information packet comprises:
  identifying whether the source represents a new source with which the vehicle connectivity system has not previously communicated within a predetermined timeframe or an existing source with which the vehicle connectivity system has previously communicated within the predetermined timeframe;
  responsive to identifying the source as the new source, assigning a first value to a first weighting factor;
  responsive to identifying the source as the existing source, assigning a second value to the first weighting factor based on a verification of historical information received from the source and maintained in a current database by the vehicle connectivity system, wherein the current database contains trusted information representing a current status of an environment in which the connected car is operating, including a status of a road on which the connected car is driving and status information associated with the neighboring vehicles in proximity to the connected car;

determining a degree of coherence of data regarding vehicle position and path history contained within the vehicle information packet with map information maintained by the connected car and assigning a third value to a second weighting factor based on the determined degree of coherence; and setting the trustworthiness value based on at least the first weighting factor and the second weighting factor.

26. The system of claim 25, wherein said causing the determined action to be taken by the vehicle connectivity system comprises one or more of:

causing the vehicle connectivity system to wait for additional data packets from the source before considering it as a trusted source;

causing the vehicle connectivity system to drop the vehicle information packet; and causing the vehicle connectivity system to update the current database by incorporating information extracted from the vehicle information packet into the current database.

27. The system of claim 25, wherein the method further comprises:

measuring a degree of coherence of information contained in the vehicle information packet with corresponding information previously received from other of the plurality of sources, including verifying the information contained in the vehicle information packet with reference the current status of the environment as represented within the current database;

assigning a forth value to a third weighting factor based on the measured degree of coherence; and wherein said setting the trustworthiness value additionally includes incorporating the third weighting factor.

28. The system of claim 27, wherein the method further comprises:

correlating the information contained in the vehicle information packet with heterogeneous data available from one or more sources other than the plurality of sources and assigning a fifth value to a forth weighting factor based on said correlating; and wherein said setting the trustworthiness value additionally includes incorporating the forth weighting factor.

29. The system of claim 24, wherein the attributes include information regarding one or more of Global Positioning System (GPS) coordinates, acceleration, path history, dimensions, speed and direction.

30. The system of claim 24, wherein the vehicle information packet comprises a Cooperative Awareness Message (CAM).

31. The system of claim 24, wherein the one or more other sources are selected from any or a combination of a radio detection and ranging (RADAR) system, light detection and ranging (LIDAR), a sensor, and a camera associated with the connected car.

32. A vehicle connectivity system of a connected car, the system comprising:

a non-transitory storage device having embodied therein instructions; and one or more processors coupled to the non-transitory storage device and operable to execute the instructions to perform a method comprising:

receiving an event information packet indicative of an event that has potential impact on road safety or traffic conditions from a source of a plurality of sources, wherein the plurality of sources purportedly represent neighboring vehicles in proximity to the connected car;

determining a trustworthiness value for the event information packet based on the source and coherence of the event information packet with local information maintained by the connected car, wherein the trustworthiness value is indicative of a likelihood that the source represents a neighboring vehicle in proximity to the connected car from which communications are to be trusted;

determining an action to be taken by the vehicle connectivity system with respect to the source or the event information packet based on the trustworthiness value; and causing the determined action to be taken by the vehicle connectivity system.

33. The system of claim 32, wherein said determining a trustworthiness value for the event information packet comprises:

identifying whether the source represents a new source with which the vehicle connectivity system has not previously communicated within a predetermined timeframe or an existing source with which the vehicle connectivity system has previously communicated within the predetermined timeframe;

responsive to identifying the source as the new source, assigning a first value to a first weighting factor;

responsive to identifying the source as the existing source, assigning a second value to the first weighting factor based on a verification of historical information received from the source and maintained in a current database by the vehicle connectivity system, wherein the current database contains trusted information representing a current status of an environment in which the connected car is operating, including reported events by one or more of the neighboring vehicles in proximity to the connected car and status information associated with the neighboring vehicles in proximity to the connected car;

determining whether the event associated with the event information packet has previously been reported by other of the neighboring vehicles in proximity to the connected car within a predetermined timeframe and assigning a third value to a second weighting factor based thereon; and setting the trustworthiness value based on at least the first weighting factor and the second weighting factor.

34. The system of claim 33, wherein said causing the determined action to be taken by the vehicle connectivity system comprises one or more of:

causing the vehicle connectivity system to wait for additional data packets from the source before considering it as a trusted source;

causing the vehicle connectivity system to drop the event information packet; and causing the vehicle connectivity system to update the current database by incorporating information extracted from the event information packet into the current database.

35. The system of claim 33, wherein the method further comprises:

determining a degree of consistency of data regarding the event contained within the event information packet with one or more of the reported events contained in the current database and assigning a forth value to a third weighting factor based on the degree of consistency; and wherein said setting the trustworthiness value additionally includes incorporating the third weighting factor.

36. The system of claim 35, wherein the method further comprises:
  determining a degree of coherence of the data regarding the event contained within the event information packet with one or more vehicle information packets received from one or more sources of the plurality of sources and indicative of one or more attributes of the one or more sources from which the vehicle information packet was received and assigning a fifth value to a forth weighting factor based on the degree of coherence; and
  wherein said setting the trustworthiness value additionally includes incorporating the forth weighting factor.

37. The system of claim 36, wherein the method further comprises:
  correlating the information contained in the event information packet with heterogeneous data available from one or more sources other than the plurality of sources and assigning a sixth value to a fifth weighting factor based on said correlating; and
  wherein said setting the trustworthiness value additionally includes incorporating the fifth weighting factor.

38. The system of claim 36, wherein the one or more attributes include information regarding one or more of Global Positioning System (GPS) coordinates, acceleration, path history, dimensions, speed and direction and wherein the one or more vehicle information packets comprise Cooperative Awareness Messages (CAMs).

39. The system of claim 32, wherein the one or more other sources are selected from any or a combination of a radio detection and ranging (RADAR) system, light detection and ranging (LIDAR), a sensor, and a camera associated with the connected car.

40. The system of claim 32, wherein the event information packet comprises a Decentralized Environmental Notification Message (DENM).

* * * * *